United States Patent [19]

Watson

[11] 4,188,056
[45] Feb. 12, 1980

[54] COMBINATION BOAT AND CAMPER TRAILER

[76] Inventor: Charles L. Watson, R.R. 7, Paris, Tex. 75460

[21] Appl. No.: 887,714

[22] Filed: Mar. 17, 1978

[51] Int. Cl.² .................................................. B60P 3/32
[52] U.S. Cl. .............................. 296/157; 280/414 R; 414/537
[58] Field of Search .............. 296/23 B, 23 R, 26, 296/27, 1 A; 280/414 R, 47.13 B; 214/85, 85.1

[56] References Cited

U.S. PATENT DOCUMENTS

| | | | |
|---|---|---|---|
| 1,366,771 | 1/1921 | Devencenzi | 296/26 |
| 2,193,352 | 3/1940 | Thomas | 296/23 |
| 2,245,465 | 6/1941 | Cole | 296/23 |
| 2,572,945 | 10/1951 | Quesnoit | 214/85.1 |
| 2,821,428 | 1/1958 | Webster | 296/26 |
| 2,879,103 | 3/1959 | Hall | 296/23 |
| 2,881,023 | 4/1959 | Gile | 296/23 B |
| 3,198,571 | 8/1965 | Majeski | 296/26 |
| 3,279,636 | 10/1966 | Asman | 214/515 |
| 3,363,932 | 1/1968 | Mann | 296/23 |
| 3,380,607 | 4/1968 | Dale | 296/23 B |
| 3,486,786 | 12/1969 | Howarth | 296/23 B |
| 3,550,947 | 12/1970 | Kallies | 296/23 B |
| 3,556,582 | 1/1971 | Bledsoe | 296/23 B |
| 3,584,753 | 6/1971 | Voeller | 296/23 B |
| 3,613,919 | 10/1971 | Ceepo | 296/1 A |
| 3,649,064 | 3/1972 | Bledsoe | 296/23 B |
| 3,651,969 | 3/1972 | Bledsoe | 296/23 B |
| 3,677,600 | 7/1972 | Charron | 296/27 |
| 3,697,096 | 10/1972 | Hadley | 280/47.32 |
| 3,768,673 | 10/1973 | Nydam | 296/26 |
| 3,784,248 | 1/1974 | Neuman | 296/23 B |
| 3,828,379 | 8/1974 | Walston | 280/414 R |
| 3,866,772 | 2/1975 | Gardner | 296/23 B |
| 3,902,612 | 9/1975 | Hall | 214/85 |
| 3,909,057 | 9/1975 | Guthry | 296/23 B |
| 3,970,203 | 7/1976 | Watson | 280/414 R |

Primary Examiner—Joseph F. Peters, Jr.
Assistant Examiner—John A. Carroll
Attorney, Agent, or Firm—Richards, Harris & Medlock

[57] ABSTRACT

A combination boat and camper trailer comprises a camper supporting portion secured to a boat supporting portion. The camper supporting portion includes opposed pairs of parallel, inclined guide members supporting the camper for movement between upper and lower positions. Preferably, the forward guide members include level upper portions while the upper portions of the rear members are inclined so that the camper can be tilted to facilitate water launching of the boat. Apparatus is provided for supporting the boat on dry land so that the camper can be lowered for occupancy without requiring that the boat be launched.

9 Claims, 6 Drawing Figures

COMBINATION BOAT AND CAMPER TRAILER

BACKGROUND AND SUMMARY OF THE INVENTION

The present invention relates generally to trailers. More particularly, this invention concerns a combination trailer for the simultaneous transport of a boat and a camper.

Boats and campers are extremely popular recreational items. Families which enjoy boating, fishing, camping and other outdoor activities often own some type of boat and/or camper. Many types of boats and campers are carried on trailers adapted to be attached to a towing vehicle such as an automobile or pickup truck. The flexibility and advantages of this arrangement are well known. The trailer is secured to the towing vehicle for transportation to and from the site of usage. At other times the trailer and towing vehicle are disconnected for storage or separate utilization.

Nevertheless, this arrangement can be disadvantageous to those families which would like to use both the boat and the camper during the same trip. To do so requires a separate towing vehicle for each trailer. Operation of two towing vehicles of course increases and possibly doubles the expense in transporting the trailers to the site of usage. Other additional expenses, if not inconveniences, are also incurred. For example, additional parking space is required. Since many camp grounds charge a daily fee for each parking space, it will be appreciated that this expense could be substantial over the course of a vacation trip. There is thus a need for a workable combination boat and camper trailer. The prior approaches have been characterized by impracticality. Heretofore there has not been available a camper/boat trailer which enables utilization of the camper without launching the boat, and which enables launching of the boat without removal of the camper.

The present invention solves the foregoing and other problems which have plagued the prior art. In accordance with the broader aspects of the invention, there is provided a trailer for simultaneously carrying a boat and a camper behind a single towing vehicle. The combination boat and camper trailer comprises a boat carrying portion and a camper carrying portion. The camper is supported on inclined guide members and movable between upper and lower positions. During transportation the camper is positioned above the boat. By means of the combination boat and camper trailer of the invention, the boat can be launched without removing the camper and the camper can be utilized without launching the boat.

In accordance with more specific aspects of the invention, a combination boat and camper trailer includes a frame for supporting and launching a boat. The boat supporting frame includes wheels for movably supporting said frame over a surface and a hitch for selectively coupling the trailer to a towing vehicle. A camper supporting frame is secured to the boat supporting frame. The camper supporting frame includes opposed, parallel pairs of front and rear inclined rail structures for supporting the camper therebetween. Preferably, the upper portions of the rear pair of rails extend above the upper horizontal portions of the forward pair of rails so that the camper can be tilted to facilitate water launching of the boat. Other than by water launching, supporting apparatus for attachment to the boat and the boat supporting frame can be employed to effect withdrawal of the boat on dry land so that the camper can be lowered for use. If the camper is of the "pop top" type, erection of the top can be effected simultaneously upon lowering of the camper. By means of the invention, a camper and a boat can be transported independently or simultaneously on one trailer vehicle.

DESCRIPTION OF THE DRAWINGS

A more complete understanding of the invention can be had by reference to the following Detailed Description when taken in conjunction with the accompanying Drawings, wherein.

DETAILED DESCRIPTION

Figure 1:
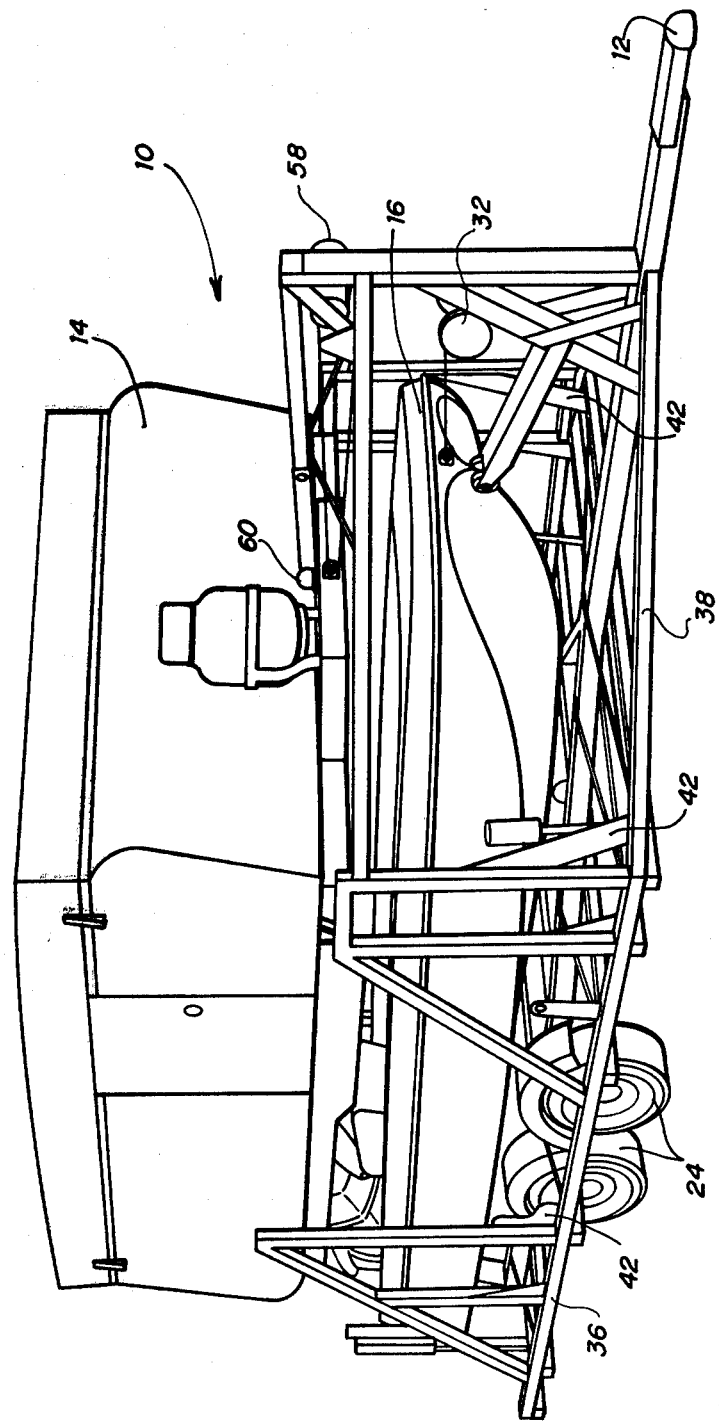
FIG. 1 is a front perspective view of a combination boat and camper trailer incorporating the invention.

Referring now to the Drawings, wherein like reference numerals designate like or corresponding parts throughout the several views, and particularly referring to FIG. 1 there is shown a combination boat and camper trailer 10 incorporating the invention. A hitch 12 is provided at the forward end of trailer 10 for releasable engagement with a towing vehicle (not shown). The hitch 12 may be of the conventional type wherein a ball member is mounted on the rear of the towing vehicle and a cooperating socket mechanism is secured to the trailer.

The trailer 10 is specifically designed for the simultaneous transport of a camper 14 and a boat 16. The camper 14 is preferably of the foldable or "pop top" variety having collapsible portions which are deployed to prepare the camper for occupancy. As shown in FIG. 1, the camper 14 is in the closed or stowed condition for transportation. The boat 16 is preferably of the runabout type having a relatively shallow draft. For purposes of illustration, the boat 16 is depicted in FIG. 1 as a "bass boat", although any suitable type of boat can be used in the invention. By means of the trailer 10, a boat and a camper can be towed to and from the site of usage by one towing vehicle. The use of one towing vehicle instead of two results in substantial savings. Moreover, the integration of a boat trailer and a camper saves considerable space. As will be more fully described hereinafter, the unique design of trailer 10 permits launching of the boat 16 without removal of the camper 14, as well as occupancy of the camper 14 without launching of the boat 16.

Figure 3:
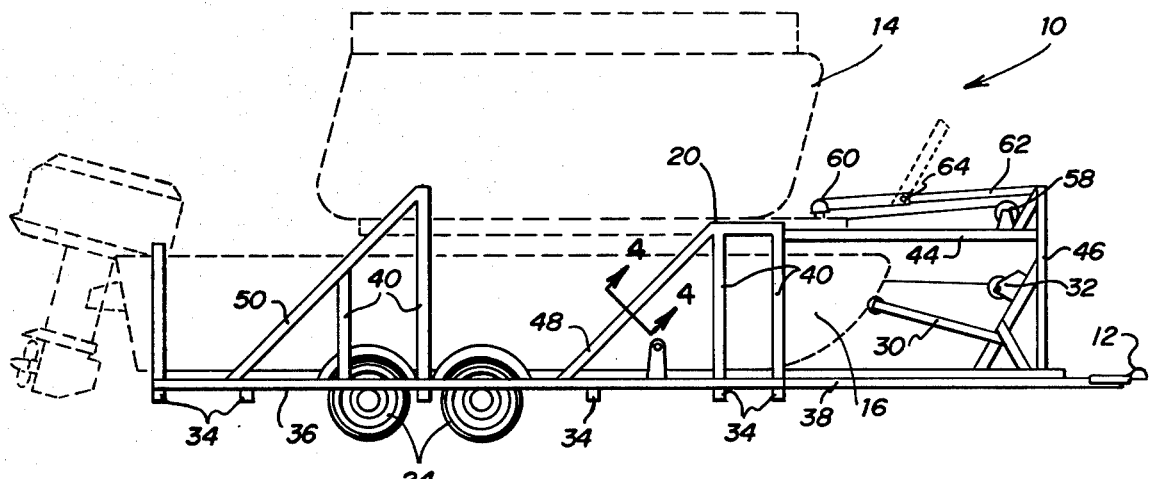
FIG. 3 is a side elevational view of the invention.
Figure 2:
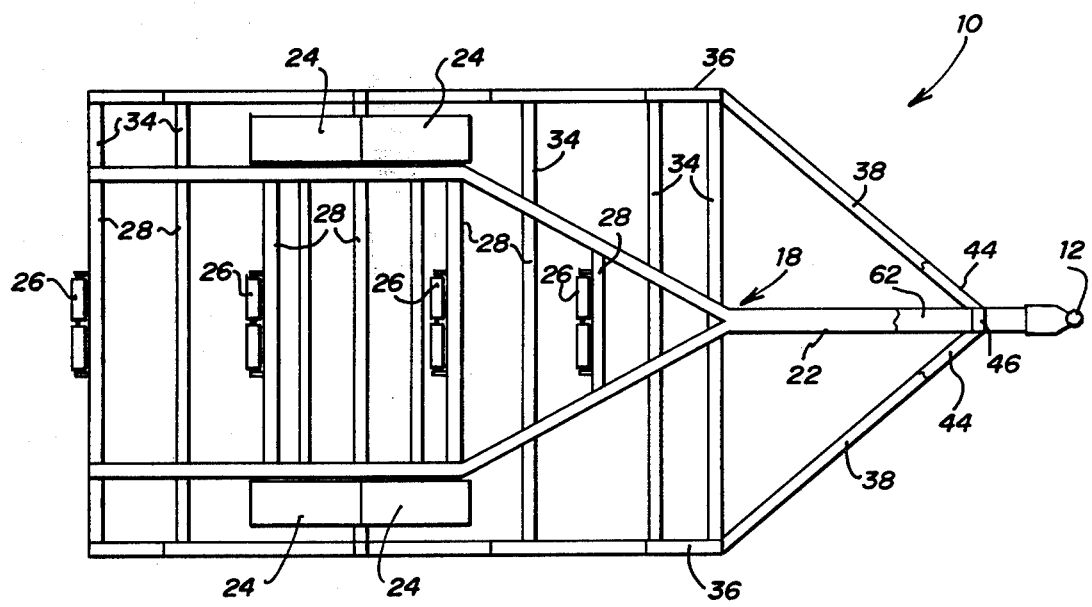
FIG. 2 is a top plan view of the invention.

Referring now to FIGS. 2 and 3, the structural details of the trailer 10 comprising the invention can be seen. For clarity the camper 14 and boat 16 have been entirely omitted from FIG. 2 and are shown only in phantom lines in FIG. 3. The trailer 10 includes a boat supporting portion 18 and a camper supporting portion 20. The boat supporting portion 18 comprises a forked frame 22 with the trailer hitch 12 mounted at the forward end thereof. The frame 22 is composed of structural members formed of rigid material such as steel. The frame 22 comprises the main frame of trailer 10 and is rollingly supported by wheels 24. Preferably, at least one pair of wheels 24 is utilized. However, depending upon the sizes of the boat 16 and camper 14, it may be advantageous to employ two pairs of wheels 24 as shown. Conventional rollers 26 provide vertical support for the boat 16. The rollers 26 are mounted on members 28 extending between the spaced apart portions of frame 22. A stop 30 is provided at the forward end of frame 22 for engagement with the bow of boat 16. A boat winch 32 is positioned at the forward end of frame 22 for drawing the boat onto frame 22, over rollers 26 and against stop 30. The winch 32 may be of either the manual or power driven variety. Conventional clamping means (not shown) are located at the rear of frame 22 for selectively securing the stern of boat 16 to frame 22. It will thus be apparent that portion 18 comprises a frame structure for supporting the boat 16.

The trailer 10 also includes camper supporting portion 20. The portion 20 comprises lateral beams 34 secured in spaced relationship to the frame 22. Side beams 36 interconnect the ends of lateral beams 34. For reinforcement, braces 38 are provided between frame 22 and the intersection of beams 34 and 36. As is best shown in FIG. 3, uprights 40 are provided at the outer ends of lateral beams 34. In the preferred embodiment of the invention, the beams 34 and 36, braces 38, and uprights 40 all comprise metal tubular members. These members can be interconnected and affixed to frame 22 by any conventional means, such as by welding. For reinforcement, gussets 42 shown in FIG. 1 can be placed between lateral beams 34 and uprights 40, if desired. The upper ends of the forward set of uprights 40 are connected by braces 44 with post 46. The post 46 is attached to frame 22. It will thus be apparent that camper supporting portion 20 is a subframe of trailer 10 comprised of structural members attached around the periphery of boat supporting portion 18.

Figure 4:
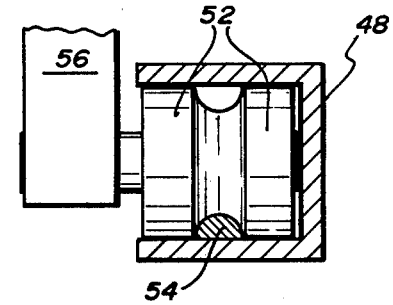
FIG. 4 is a sectional view taken along the lines 4—4 of FIG. 3.

The portion 20 further includes opposed pairs of inclined parallel rails 48 and 50 serving as guides for movement of the camper 14 between upper and lower positions. The camper 14 is supported between rails 48 and 50 on rollers 52 as is best shown in FIG. 4. According to the preferred construction of the invention, the rails 48 and 50 comprise channel sections opening inwardly. The inside, lower surface of each rail 48 and 50 preferably includes a raised bead 54, which is stradled by the rollers 52. The rollers 52 in turn are rotatably mounted on brackets 56 secured to the frame of the camper 14. It will thus be appreciated that the beads 54 on the lower surface of rails 48 and 50 serve to prevent lateral dislodgement of rollers 52, while the top surfaces of rails 48 and 50 serve to prevent any vertical dislodgement of rollers 52. The camper 14 is thus positively secured between rails 48 and 50.

Apparatus is provided for securing the camper 14 in the upper position, and for lowering the camper therefrom or raising the camper thereto. A camper winch 58 is provided for effecting controlled movement of the camper 14. The winch 58 may be of either the manual or power driven variety. Preferably, the winch 58 includes an electric motor which is connected to a suitable source of power, such as the electrical system of the towing vehicle (not shown). The camper 14 is locked in the upper position by means of a hitch 60 located at the end of a member 62 extending from the post 46. Preferably, the two portions comprising member 62 are pivotally interconnected by pin 64. This facilitates engagement and disengagement between the hitch 60 and camper 14, and enables hitch 60 to be moved to a noninterfering position as shown in phantom lines in FIG. 3.

The opposed pairs of inclined rails 48 and 50 are a significant feature of the present invention. The upper ends of forward rails 48 turn into horizontal portions which guide the front end of the camper 14 forward only on the trailer 10. The upper ends of the rear rails 50 do not include horizontal portions but continue in an inclined manner above the level of the horizontal portions of forward rails 48. It will thus be appreciated that the back end of camper 14 is always supported on an inclined surface and is thus constantly subject to the effects of gravity. The front end of the camper 14 may be resting either on an inclined surface or a level surface. Consequently, the camper 14 is lowered under gravity by the winch 58. It is not necessary to first move the camper 14 rearward before the effects of gravity take place. In addition, by disengaging and pivoting hitch 60 out of interference, it will be seen that the camper 14 can be drawn forward by the winch 58 so that the back end of camper 14 is raised. This feature enables the trailer 10 to be more easily positioned in water for launching of the boat 16 without requiring removal of the camper 14. The additional clearance so provided greatly facilitates launching of the boat 16. Of course, after the boat 16 has been launched and the trailer 10 has been towed back onto dry land, the camper 14 can be returned to a level orientation and fastened with hitch 60 in the upper position, or allowed to descend on rails 48 and 50 to the lower position. It will be understood that the camper 14 can be transported on trailer 10 in either the upper or lower position.

Figure 5:
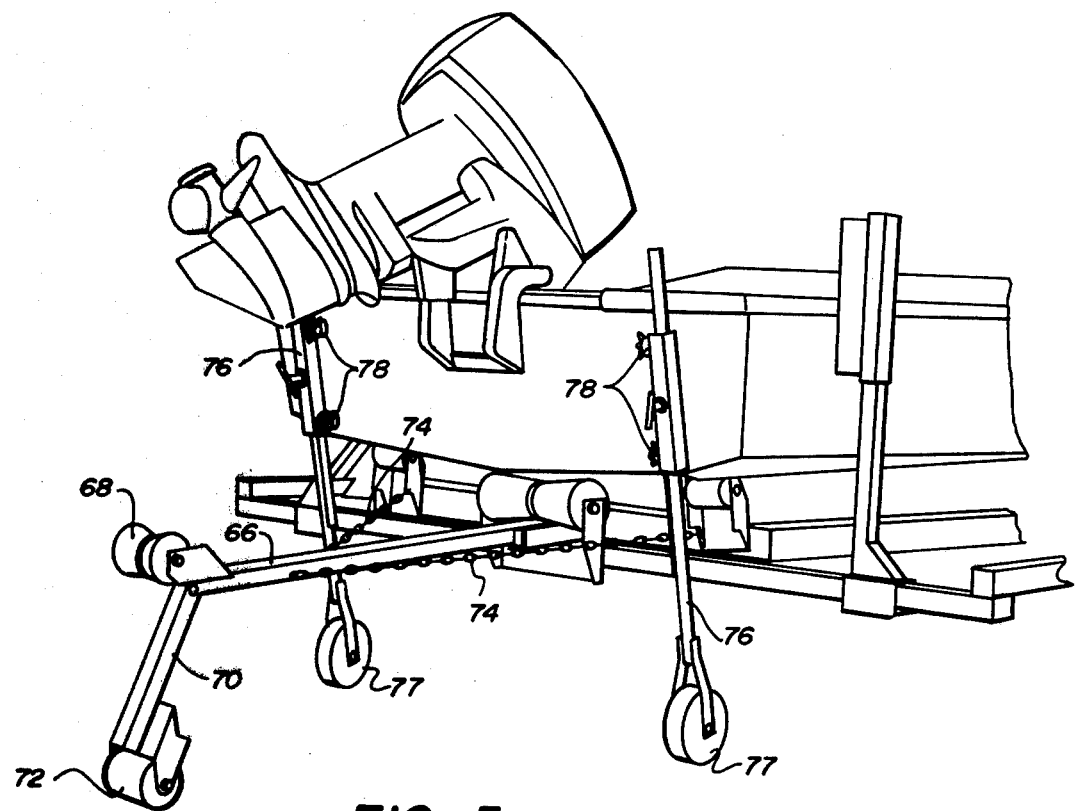
FIG. 5 is a rear perspective view of the invention.

Referring now to FIG. 5, there is shown the apparatus which enables the boat 16 to be withdrawn from the trailer 10 on dry land so that the camper 14 can be lowered for occupancy. A trailing arm 66 is pivotally secured to the rear of the trailer 10. In particular, the arm 66 is mounted for movement about the vertical axis. The arm 66 is stored adjacent to the frame 22 and fastened thereto during transportation. A roller 68 is attached to the distal end of the arm 66. Also attached to the distal end of arm 66 is a hinged leg 70 on which a wheel or roller 72 is rotatably mounted. During transportation the leg 70 is folded up and secured to arm 66. When deployed as illustrated in FIG. 5, the arm 66 is preferably stabilized by chains 74 connected to frame 22.

Struts 76, each having a wheel 77 rotatably mounted at the lower end thereof, are also provided for attachment to the transom of the boat 16 as shown. During transportation the struts 76 are stowed. The struts 76 can be attached to boat 16 in any conventional manner. In accordance with the preferred embodiment of the invention, two pairs of eyebolts 78 are provided in the transom of the boat 16 for engagement with threaded studs on the struts 76. The struts are preferably of telescoping construction.

Figure 6:
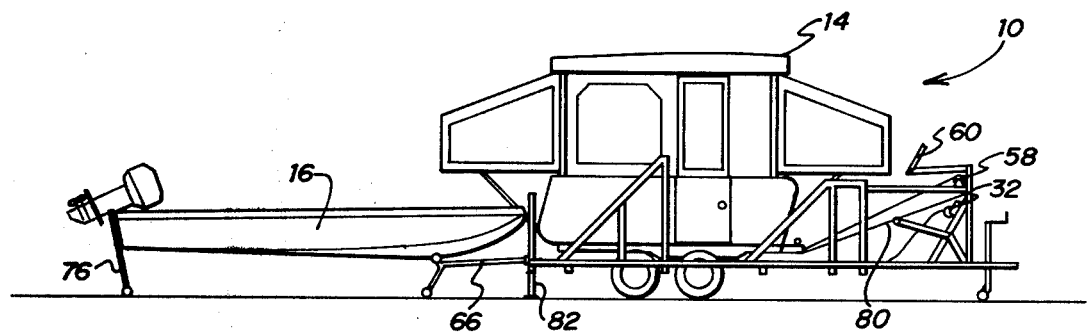
FIG. 6 is a side elevational view of the invention illustrating the boat in a withdrawn position and the camper in a lowered position.

To withdraw the boat 16, arm 66 is extended and struts 76 are connected to the boat. The wheels 77 of struts 76 are then chocked or blocked against movement and the boat winch 32 is released. The trailer 10 is then towed forward a predetermined distance until the boat 16 is supported on struts 76 and roller 68. In actual practice it has been found that a mark placed on the line of boat winch 32 can be used to indicate when the trailer 10 has been sufficiently advanced. With the boat 16 positioned behind trailer 10, the line of boat winch 32 is then removed so that the camper 14 can be lowered into position for occupancy. Disengagement of the hitch 60 allows the winch 58 to lower camper 14 under the action of gravity. If the camper 14 is of the "pop top" variety, it is pointed out that this descending movement can be utilized to simultaneously raise the roof of the camper 14. Such "pop top" type cameras typically employ a cranking arrangement comprising pulleys and cables for raising and lowering the roof. Accordingly, in the preferred embodiment of the invention a fixed length cable, such as cable 80 shown in FIG. 6, is fastened between the trailer 10 and the roof cranking arrangement of the camper 14 so that the top is automatically raised as the camper 14 is lowered. If desired, outriggers 82 can be attached to the trailer 10 to lend additional stability thereto.

FIG. 6 illustrates the combination boat and camper trailer 10 with the boat 16 in a withdrawn position and the camper 14 in a lowered position. To prepare the trailer 10 for transport, the procedure set forth in the preceding paragraph is undertaken in the reverse order.

From the foregoing, it will be understood that the present invention comprises a combination boat and camper trailer having numerous advantages over the prior art. One significant advantage involves the fact that a boat and a camper can be simultaneously transported on one trailer with one towing vehicle. The boat can be launched from the trailer without requiring removal of the camper. Furthermore, the camper can be tilted to provide more clearance and thus facilitate the launching of the boat. A principal advantage of the invention is the fact that the boat can be withdrawn from the trailer on dry land so that the camper can be lowered for occupancy. Other advantages derived from the invention will readily suggest themselves to those skilled in the art.

Although preferred embodiments of the invention have been illustrated in the accompanying Drawings and described in the foregoing Detailed Description, it will be understood that the invention is not limited to the embodiments shown and described, but is capable of numerous rearrangements, modifications and substitutions of parts or elements without departing from the spirit and scope of the invention.

What is claimed is:

1. In a trailer for transporting and launching a boat, the improvement comprising:
   structure defining a frame rigidly secured to the trailer for supporting a camper;
   said frame including front and rear pairs of forwardly inclined guide members mounted on opposite sides of the trailer and supporting the camper for movement between an upper position over the boat and a lower position wherein the camper rests on the trailer in place of the boat;
   said camper being positioned between said guide members and constrained for movement along said guide members;
   means for selectively securing the camper to the frame in the upper position on said guide members; and
   camper winch means connected between the camper and the frame for selectively effecting movement of the camper along the guide members between upper and lower positions.

2. The trailer of claim 1 wherein the front pair of guide members include substantially level upper portions extending forwardly, and wherein the rear pair of guide members include upper portions continuing in an inclined manner above the level portions of the front guide members so that forward movement of the camper along said guide members raises the back end of the camper to provide additional clearance with the boat.

3. The trailer of claim 1 wherein the guide members each includes a support surface with a central ridge extending the length thereof, and wherein the camper is supported on said guide members by pairs of rollers mounted on said camper and stradling said ridges to prevent lateral dislodgement of the camper therefrom.

4. The trailer of claim 1 including means for withdrawing and supporting the boat on dry land which comprises:
   a trailing arm assembly secured about a pivot on the rear of the trailer and mounted for movement between a stowed position adjacent the frame of the trailer and a trailing position extending centrally behind the trailer;
   a roller rotatably mounted on the trailing arm assembly for engagement with the bottom of the boat; and
   a pair of struts for lateral, spaced demountable attachment to the transom of the boat including wheel means rotatably secured to the lower ends of said struts for engagement with the land.

5. A combination boat and camper trailer adapted to be towed by a towing vehicle, which comprises:
   structure defining main frame means for supporting the boat;
   said main frame means including a front end, a back end and a plurality of rollers supporting said boat;
   hitch means located at the front end of said main frame means for releasably coupling said trailer to the towing vehicle;
   wheel means rotatably mounted on the frame and supporting the trailer for rolling movement;
   structure defining subframe means rigidly secured to the main frame means for supporting the camper;
   said subframe means including front and rear pairs of forwardly inclined guide members secured to opposite sides of said main frame means;
   roller means connected to the camper and engaging said guide members such that the camper is supported on said guide members for movement between an upper position above the boat and a lower position in place of the boat, said camper being constrained for movement along said guide members;
   means for releasably securing the camper to the subframe means in the upper position on said guide members;
   camper winch means mounted on the subframe means for controlling movement of the camper along said guide members; and
   boat winch means mounted on the main frame means for selectively drawing the boat onto the trailer.

6. The trailer of claim 5 wherein the front pair of guide members include substantially level upper portions extending forwardly and below the upper inclined portions of the rear pair of guide members so that forward movement of the camper along said guide members tilts the camper forwardly to provide additional clearance between the back of the camper and the boat.

7. The trailer of claim 5 wherein the guide members are formed of channel sections including top and bottom walls interconnected by a side wall, and wherein the inner surface of the bottom wall on each channel section includes a central ridge extending the length thereof with said roller means being positively engaged over said ridges and within said channel sections to prevent dislodgement from the guide members.

8. The trailer of claim 5 including means for withdrawing and supporting the boat on dry land which comprises:
- a trailing arm pivotally secured at one end to the rear of the trailer and mounted for movement between a stowed position adjacent the trailer and a trailing position extending behind the trailer;
- a roller rotatably mounted on the trailing arm for engagement with the bottom of the boat;
- a leg pivotally secured to the other end of the trailing arm and including a roller at the lower end thereof on which the trailing arm rests; and
- means demountably attached to the boat for supporting the boat for movement over the land.

9. A combination boat and camper trailer adapted to be towed by a towing vehicle, comprising:
- a main frame with front and rear ends and a plurality of rollers mounted thereon for supporting the boat;
- a hitch mounted on the front end of the main frame for releasably connecting the trailer and towing vehicle;
- a boat winch mounted on the main frame for selectively drawing the boat onto the trailer;
- at least one pair of wheels rotatably mounted on the main frame for movably supporting the trailer;
- a subframe disposed above the main frame for supporting the camper, said subframe being rigidly secured to the main frame;
- said subframe including front and rear pairs of forwardly inclined and upright guide members located on opposite sides of said main frame;
- each of said guide members being of generally channel-like cross section and including a central ridge on the inside thereof extending the length of the guide member;
- roller means rotatably mounted on the camper and positively engaged within each guide member so that the camper is supported and constrained for movement along said guide members between an upper position above the boat and a lower position in place of the boat; and
- a camper winch mounted on the subframe for controlling movement of the camper along said guide members;
- said front guide members including substantially level upper portions extending forwardly in a plane below the upper ends of the inclined rear guide members so that the back end of the camper can be raised to provide extra clearance by effecting forward movement of the camper along said guide members.

* * * * *